United States Patent [19]

Foster et al.

[11] 4,059,359

[45] Nov. 22, 1977

[54] METHOD AND APPARATUS FOR QUANTIZING RADIATION BEAMS BY OPTICAL DIFFRACTION

[75] Inventors: J. Walter Foster, Oakdale; Charles L. Dunkerley, Levittown, both of N.Y.

[73] Assignee: Grumman Aerospace Corporation, Bethpage, N.Y.

[21] Appl. No.: 672,989

[22] Filed: Apr. 2, 1976

[51] Int. Cl.$^2$ .................... G01J 1/42; G01K 17/00
[52] U.S. Cl. .................... 356/222; 73/190 EW; 250/352; 250/216
[58] Field of Search .............. 356/222, 225, 98, 88; 250/339, 345, 352, 353, 578, 216; 73/190 EW

[56] References Cited

U.S. PATENT DOCUMENTS

| | | | |
|---|---|---|---|
| 3,121,798 | 2/1964 | Ploke | 356/225 |
| 3,738,168 | 6/1973 | Mansell | 73/190 EW |
| 3,934,153 | 1/1976 | Lindley | 250/578 |
| 3,939,706 | 2/1976 | Pinson | 73/190 EW |

FOREIGN PATENT DOCUMENTS 393,789  2/1974  U.S.S.R. .................... 356/222

Primary Examiner—John K. Corbin
Assistant Examiner—Rolf Hille
Attorney, Agent, or Firm—Morgan, Finnegan, Pine, Foley & Lee

[57] ABSTRACT

A method and associated apparatus for quantizing radiation beams by optical diffraction including the steps of, and associated apparatus for, reflecting a majority of the energy in an incident radiation beam, optically diffracting portions of the non-reflected incident radiation beam to provide quantized radiation beam portions of reduced intensity, and individually detecting each of the quantized radiation portions. Advantageously, the detected radiation beam portions are converted to electrical signals which may be processed for display, as desired.

22 Claims, 5 Drawing Figures

METHOD AND APPARATUS FOR QUANTIZING RADIATION BEAMS BY OPTICAL DIFFRACTION

The present invention relates to calorimeters, and more specifically to a method and apparatus for quantizing radiation beam configurations.

Generally, high energy radiation beam configurations have been estimated manually by qualitative visual examination of the burn patterns produced in Plexiglas and Marinite targets.

Another approach employs a calorimeter which absorbs the entire incident beam to provide an energy v. time data distribution. Such as approach is incapable of resolving individual portions of the radiation beam and therefore cannot provide flux distribution data. Examples of such systems are found in U.S. Pat. Nos. 2,500,547 (Kalmus et al.); 3,348,055 (Bulpitt); 3,483,747 (Soffer et al.); 3,575,048 (De Benedictis); 3,596,514 (Mefferd et al.); 3,622,245 (Rasmussen); 3,639,065 (Rothrock et al.); and 3,687,558 (Rex).

Another system employs imaging devices, similar to the cathode ray tubes used in televisions, for detecting the energy back-scattered from a target. Back-scattered energy is subject to many variables, such as non-uniformity in the reflectivity of the target, atmospheric transmission distortions, etc. While contour and profile data is generated, this data is primarily qualitative. Such a system is disclosed in U.S. Pat. No. 3,680,965 (Dilworth et al.).

It is an object of the present invention to provide a quantitative determination of radiation beam configurations.

It is a further object of the present invention to provide a quantitive determination of radiation beam configurations at destructively high energy levels.

It is a further object of the present invention to provide a method and apparatus capable of spatial and temporal resolution of high energy radiation within a collimated infrared or visible light beam.

It is a further object of the present invention to provide quantitive measurements of radiant flux which describe the spatial and temporal distribution of energy within a collimated infrared or visible light beam.

Other objects, aspects, and advantages of the present invention will be apparent from the detailed description.

Briefly, the present invention includes the method and associated apparatus for quantizing radiation beams by optical diffraction including the steps of, and associated apparatus for, reflecting a majority of the energy in an incident radiation beam, optically diffracting portions of the non-reflected incident radiation beam to provide quantized radiation beam portions of reduced intensity, and individually detecting each of the quantized radiation beam portions. Advantageously, the detected radiation beam portions may be converted to electrical signals which may be processed for display, as desired.

The preferred embodiments of the present invention are illustrated in the accompanying drawings, in which.

Figure 1:
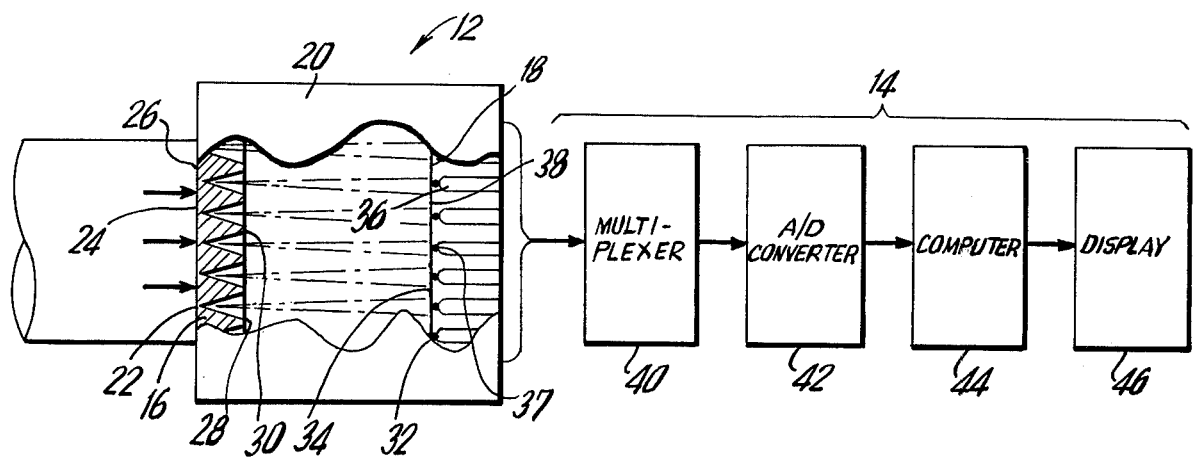
FIG. 1 is a composite side view, with parts broken away, of the attenuator-receiver with a block diagram of one suggested arrangement of signal processing equipment for use with the attenuator-receiver.

Referring to FIG. 1, the apparatus of the present invention generally includes an attenuator-receiver or target 12 and output data acquisition means, such as, for example, signal conditioning means 14. However, it should be understood that other output data acquisition means can be used as desired, e.g., directly coupled voltmeters, a multi-channel strip-recorder, galvanometers, and oscilloscopes.

The target 12 includes an attenuator portion or plate 16 and a receiver portion or plate 18. The attenuator plate 16 and receiver plate 18 are positioned in a fixed, space relationship in a housing 20.

The attenuator plate 16 is formed of a good heat absorbing material, e.g., copper, aluminum, nickel, niobium, etc., and is, for example, typically ½ inch in thickness. Its area is determined by the cross-sectional area and stability of the impinging incident energy beam and may be of any suitable size. By way of example only, the size of the attenuator plate 16 may vary between about 6 inches square to about 3 foot square or more. The attenuator plate 16 includes a predetermined pattern or array of accurately formed diffracting apertures 22 which form a diffraction matrix. The diameter of each aperture 22 is determined by the anticipated incident energy intensity and the level of attenuation necessary to protect the receiver plate 18. That is, the greater the intensity of the incident energy the smaller the diameter of the apertures 22. Typically, the diameter of the apertures 22 will range in size from about 100 to about 1000 microns and may be spaced as close as 5 mm. apart.

A reflective layer 24 may be provided on the incident surface 26 of the attenuator plate 16. Preferably the reflective layer 24 may be formed of gold, several microns thick, having a reflectivity of about 0.98 to about 0.99. The reflective layer 24 may be advantageously crown-shaped or include a curvature to control the direction of the reflected energy. However, dependent upon the desired application and safety considerations encountered, the incident surface 26 may be scattering, or ablative non-scattering. For example, under laboratory conditions or for a non-moving target 12 in which reflected energy from the incident radiation beam does not pose a safety problem, a reflective layer 24 having a mirror-type specular finish may be provided. When target 12 is moving, e.g., when mounted on a ground vehicle or aircraft, a scattering finish may be employed on the incident surface 26. Such a finish can be provided on the incident surface 26 by sand-blasting this surface so that the incident energy is scattered in accordance with the Inverse Square Law or Lambert's Law. In applications where the possibility of reflection cannot be tolerated, an ablative layer formed from a material like pyrolytic graphite or beryllium oxide can be provided on the incident surface 26.

An energy absorbing layer 28 is provided on the rear or beam exiting surface 30 of the attenuator plate 16. This energy absorbing layer 28 may be obtained by simply not polishing this surface of the metal from which the plate 16 is fabricated.

The energy transmitted through the diffracting apertures 22 is optically diffracted to substantially reduce its intensity by increasing the cross-sectional area of the sampled incident energy beam portions.

The receiver plate 18 may be advantageously formed of a cobalt-nickel steel alloy, available commercially as Haynes 25. An energy absorbing layer 32 is advantageously formed on the incident surface 34 of the receiver plate 18 by heat-treating the incident surface. Other teachings well known in the art can also be utilized to provide an absorptive finish. The layer 32 has a broad spectral response to present little, if any, absorptivity variation to a wide band of infrared wavelengths. Preferably, the energy absorbing layer 32 has an absorptivity of about 0.5 to about 0.8.

The diameter of cross-sectional area of the receiver plate 18 advantageously matches that of the attenuator plate 16. Its thickness may vary in accordance with the desired heat sink capability. However, the receiver plate thicknesses ranging from about 0.254 to about 0.508 mm. have been used successfully. Advantageously, since the receiver plate 18 has a finite mass, it may be used to integrate or average the input temperature signals over a given time period to determine the energy received by the receiver plate 18, if this is desired rather than report the rate of change of temperature.

A plurality of metallic sensors 36, for example, of the well-known thermocouple type, are coupled to the receiver plate 18 with thermocouple junctions 37 welded to the rear surface 38 of the receiver plate 18. Each sensor 36 is axially aligned with a particular diffracting aperture 22, so that the pattern of sensors 36 coupled to the receiver plate 18 matches or is compatible with the pattern of the diffracting apertures 22 in the attenuator plate 16. Thus, each diffracting aperture 22 is associated with a single sensor 36 and transmits energy only to that sensor 36.

Figure 2:
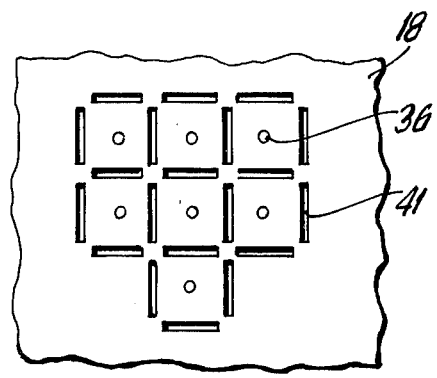
FIG. 2 is a plan view of the receiver plate showing an arrangement of metallic sensors with termally isolating slots.
Figure 3:
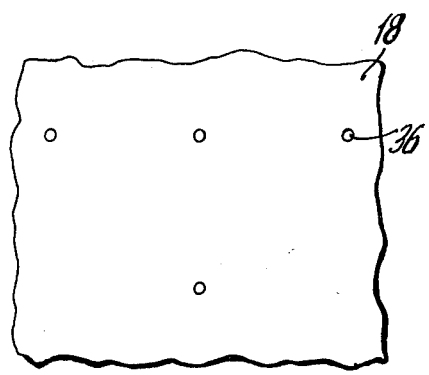
FIG. 3 is a plan view of the receiver plate with another arrangement of the metallic sensors to obtain thermal isolation therebetween.
Figure 4:
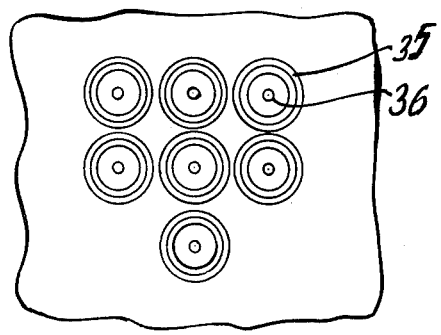
FIG. 4 is a plan view of the receiver plate with another arrangement of the metallic sensors encased in tubes with insulating sleeves for isolation.
Figure 5:
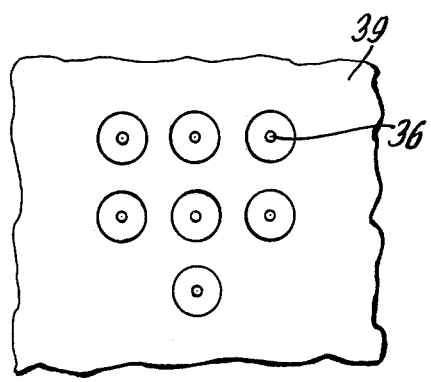
FIG. 5 is a plan view of the receiver plate with an isolating support matrix and metallic sensors arranged thereon in a manner similar to that shown in FIG. 4.

If resolution requirements dictate close spacing between the sensors 36 (5 mm. center-to-center), slots 41, such as shown in FIG. 2, may be cut in the receiver plate 18 to outline and isolate individual sensor areas. The slots 41 lengthen the thermal conductive paths between the sensors 36 in the receiver plate 18 and limit cross-talk errors. However, other techniques may be used to thermally isolate the sensors 36 from one another. For example, when employing a thin steel receiver plate 18 having a large spacing between sensors 36, see FIG. 3, and a short exposure time to the incident radiation beam, the relatively low conductivity of the receiver plate 18 serves effectively to thermally isolate the sensors 36 from one another. Preferably, the slots 41 are used with a thicker receiver plate 18 having closely spaced sensors 36 to increase the heat path between the sensors 36 and thus provide effective thermal isolation therebetween. Moreover, in some applications of the invention, such as for airborne equipment, the necessary packaging density of the sensors 36 requires that other insulating means be used. As shown in FIG. 4, one such approach is to embed each sensor 36 in silver and encase the embedded sensor 36 in a tube 35 including a sleeve for isolation. Each embedded sensor 36 is positioned at one end of each tube 35, with the other end, the distal end of each tube, being open. The silver has a mass sufficient to provide the required thermal properties and is thermally isolated from the walls of the metal tube with the insulating sleeve. Alternatively, as shown in FIG. 5, the embedded sensors 36 can be coupled to the receiver plate 18 through an insulating support matrix 39 which provides thermal isolation.

The spacing between the attenuator plate 16 and receiver plate 18 is preferably from about 3 mm. to about 80 cm. depending upon the intensity of the radiation beam and the diameter of the diffracting apertures 22. The range of diameters of the diffracting apertures 22 and the spacing between attenuator plate 16 and receiver plate 18 result in an attenuation of generally from about 1:1 to about $1:0.5 \times 10^6$.

The sensors 36 can be electrically coupled to the data acquisition means such as the system indicated generally as means 14. The data acquisition means 14, as shown in FIG. 1, includes a multiplexer 40 which scans all of the sensors 36 at a predetermined rate and conditions the output signals. Such a multiplexer is available commercially as the Avco Type-A from Avco, Inc. The output from the multiplexer 40 is in the form of a mulitplicity of voltage amplitudes representing input flux amplitudes per unit time at known coordinates.

The multiplexer 40 is electrically coupled to an A/D converter 42, such as the type commercially available from Analogic Corporation for converting the resulting analog signals to digital form.

The A/D converter 42 is electrically coupled to a digital computer 44, such as PDP 8-M available from Digital Equipment Corporation, which operates under software control to produce the desired analysis of the input data. Such software programs are well known to those skilled in the art.

The computer 44 may be electrically coupled to a suitable display 46 for presenting a quantitative representation of the beam configuration in the format desired. This format may include flux contour charts, beam profiles, coordinates of the centroid of energy as a function of time, as well as other data required to provide boresight information, quality control information, laser system diagnosis, control data for propagation experiments, as well as other formats.

It should be understood that the specific components of the data acquisition means 14 may be modified in accordance with the type of display desired. For example, the output from the A/D converter 42 may be applied to magnetic tape for storage, and the output of the multiplexer 40 may be sent directly to an analog display device. Videotapes or oscilloscopes may be included to analyze small time intervals of continuous waves or pulses of radiant energy, and telemetry apparatus may be included to present an immediate, real-time display from an airborne target system to a discrete remote station.

In operation, discrete portions of the incident radiant energy, generally from a laser beam, are sampled by transmission through the specific spatial sampling points established by the diffracting apertures 22. This sampled energy is diffracted by the diffracting apertures 22 in accordance with the physical laws of Fresnel and attenuated to a level acceptable to and measurable by the sensors 36. The sensors 36 transfer the heat energy into voltages which are processed, e.g., by the data acquisition means 14, to provide a cross-sectional analysis of the power density of the laser beam. The vast majority of the non-diffracted incident radiant energy is reflected, scattered, or absorbed by the incident surface 26. A small portion of the non-diffracted incident radiant energy is absorbed by the attenuator plate 16, and rapidly dissipated throughout the attenuator plate 16, causing a distribution of temperature gradients. After discontinuance of a burst of incident radiant energy, continued conductivity causes diminution of the temperature gradients and the attenuator plate 16 approaches a comparatively uniform temperature. Radiation, conduction, and convection remove the trapped heat energy from the attenuator plate 16 and restore it to ambient temperature.

It should be understood by those skilled in the art that various modifications may be made in the present invention without departing from the spirit and scope thereof as described in the specification and defined in the appended claims.

What is claimed is:

1. A method for quantizing a radiation beam, including the steps of:
   sampling discrete portions of an incident radiation beam with a diffraction matrix to eliminate a substantial portion of the energy of the incident radiation beam;
   optically diffracting on-axis the sampled portions of the incident radiation beam to provide quantized radiation beam portions of reduced intensity; and
   individually detecting the quantized radiation beam portions with a receiving plate having a plurality of sensors affixed thereto.

2. The method claimed in claim 1, including the step of:
   transforming the detected radiation beam portions to electrical signals;
   processing the electrical signals to provide information concerning the incident radiation beam.

3. The method claimed in claim 1, including the step of:
   absorbing a portion of the incident radiation beam in the diffraction matrix.

4. The method claimed in claim 1, including the step of:
   reflecting a substantial portion of the incident radiation beam from the diffraction matrix.

5. The method claimed in claim 1, including the step of:
   scattering a substantial portion of the incident radiation beam from the diffraction matrix.

6. The method claimed in claim 1, including the step of:
   thermally isolating the detected quantized radiation beam portions.

7. The method claimed in claim 1, including the step of:
   absorbing some of the incident radiation beam after the optical diffraction and prior to detection.

8. The method recited in claim 1, including the step of:
   integrating the quantized radiation beam portions.

9. A method of quantizing a laser beam, including the steps of:
   sampling with a diffraction matrix discrete portions of an incident laser beam to be quantized;
   absorbing a portion of the incident laser beam by the diffraction matrix during sampling thereof;
   optically diffracting on-axis the sampled portions of the incident laser beam to provide quantized laser beam portions of reduced intensity;
   absorbing some of the quantized laser beam after optical diffraction thereof;
   individually detecting the optically diffracted laser beam portions;
   transforming the detected quantized laser beam portions into electrical output signals; and
   processing the electrical signals representative of the quantized laser beam portions to provide information concerning the incident laser beam.

10. A method for quantizing radiation beams, including the steps of:
    positioning a diffraction matrix in the path of a high energy radiation beam;
    eliminating a substantial portion of the energy of the incident radiation beam;
    absorbing some of the energy of the incident radiation beam in the diffraction matrix;
    optically diffracting portions of the incident radiation beam through the diffraction matrix to provide quantized radiation beam portions of reduced intensity;
    arranging detectors at a predetermined distance from the diffracting matrix to receive the quantized radiation beam portions therefrom; and
    transforming the quantized radiation beam portions into electrical signals.

11. The method claimed in claim 10 in which the diffraction matrix includes a predetermined pattern of diffraction apertures, including the step of:
    arranging the detectors in a pattern compatible with the pattern of the diffraction apertures so that each detector receives a quantized radiation beam portion from a specific aperture of the diffraction matrix.

12. The method recited in claim 11, including the step of:
    processing the electrical signals to provide information concerning the incident radiation beam.

13. The method recited in claim 10, including the step of:
    thermally isolating each of the detectors from one another.

14. An apparatus for quantizing a radiation beam, comprising:
    a diffraction matrix positioned in the path of a high energy radiation beam, said diffraction matrix having an incident surface for eliminating a substantial portion of the incident radiation and a plurality of diffraction apertures arranged in a predetermined pattern for quantizing and reducing the intensity of portions of the radiation beam transmitted therethrough; and
    a receiving plate spaced a predetermined distance from said diffraction matrix, said receiving plate having a plurality of sensors affixed thereto and arranged in a pattern compatible with the pattern of said diffraction apertures, so that each of said sensors receives radiation energy from only one of said diffraction apertures, said sensors converting the radiant energy received thereby to electrical signals.

15. The appararuts claimed in claim 14, wherein:
    said diffraction matrix includes an energy absorbent coating on its rear surface;
    said receiving plate includes an energy absorbing coating on its incident surface.

16. The apparatus claimed in claim 14, wherein:
    said receiving plate includes surface slots to lengthen the thermal paths between individual sensors and limit cross talk errors.

17. The apparatus claimed in claim 14, wherein:

said sensors include thermocouples affixed to said receiving plate.
18. The apparatus claimed in claim 14, wherein:
said diffraction matrix and said receiving plate are fixedly spaced relative to one another in a housing.
19. The apparatus claimed in claim 14, including:
signal processing means for processing the electrical signals generated by said sensors to provide information concerning the radiation beam.
20. The process claimed in claim 19, wherein:
said signal processing means includes a multiplexer.
21. The apparatus claimed in claim 20, wherein:
said signal processing means includes an analog to digital converter coupled to said muliplexer and a digital computer coupled to said analog to digital converter.
22. The apparatus claimed in claim 14, wherein:
said receiving plate integrates the received radiation energy.

* * * * *